United States Patent [19]

Griffin

[11] Patent Number: 4,625,428

[45] Date of Patent: Dec. 2, 1986

[54] LIGHTED PLUMB BOB

[76] Inventor: Gerald E. Griffin, 1207 Deerfield Ct., Ontario, Calif. 91761

[21] Appl. No.: 727,732

[22] Filed: Apr. 26, 1985

[51] Int. Cl.⁴ .............................................. G01C 15/10
[52] U.S. Cl. ......................................... 33/348; 33/392
[58] Field of Search .................................... 33/348, 392

[56] References Cited
FOREIGN PATENT DOCUMENTS 547411  9/1922  France ................................. 33/348

Primary Examiner—Harry N. Haroian
Attorney, Agent, or Firm—Edgar W. Averill, Jr.

[57] ABSTRACT

An improved plumb bob having a downwardly directed light beam to indicate the point directly below the plumb bob. The light is operated by batteries within the plumb bob and, in order to prevent undesired draining of the batteries, the light is switched on and off by the weight of the plumb bob acting on the line. The switch is activated by a conductive spring held within the plumb bob.

6 Claims, 3 Drawing Figures

LIGHTED PLUMB BOB

BACKGROUND OF THE DISCLOSURE

The field of the invention is measuring and defining tools and the invention relates more particularly to plumb lines of the type utilizing a light line with a weight (plumb bob) at the lower end thereof. Such bobs when suspended, of course, define a vertical.

In many building applications, it is necessary to indicate the vertical point in a confined area as within a wall such that it is not possible for the bob to about touch the floor. It is also often desirable to mark the vertical point below the plumb bob without disturbing the bob itself. By the use of a downwardly directed beam of light such purposes may be accomplished.

Lighted plumb bobs have been devised in the past with plumb lights being disclosed in U.S. Pat. No. 1,113,519 and in illuminated surveyor's instrument disclosed in U.S. Pat. No. 2,538,475. Plumb bobs having downwardly directed beams of light are disclosed in the U.S. Pat. Nos. 2,583,491 and 2,665,498. A major difficulty with such devices, however, was the ease and rapidity with which the batteries would become discharged when the plumb bob light was inadvertently left on. For instance, when a plumb light is being used in a confined, darkened environment, it is easy to see that the light is on, but when the bob is removed from this environment, the fact that it is on is not readily evident and thus the batteries are quickly dissipated and the device becomes of minimal use.

SUMMARY OF THE INVENTION

It is an object of the present invention to provide a plumb bob having an accurately directed downward beam of light which light is switched on and off by suspending the bob on its line.

The present invention is for an improved plumb bob of the type having a generally frusto-conical, weighted body and a line affixed to the wide end of the body. The improvement of the present invention comprises the plumb bob having an axial bore in its body, said bore terminating at its lower end with a removable, generally conical member, said generally conical member having an axial opening and said member also have means for attachment to the weighted body. A light bulb and battery assembly is held within the axial bore of the weighted body, and the assembly is oriented so that the light bulb portion thereof is directed downwardly. The light bulb has two conventional terminals and the assembly has at least one battery having its first pole touching one terminal of the light bulb. Cap means are affixed to the weighted body at the upper end thereof. Said cap means having an opening therethrough. The opening lies along the axis of the weighted body, and the bottom end of the cap is electrically conducted and is electrically connected to the weighted body. The line of the plumb bob passes through the axial opening of the cap means. Electrically conducted spring means are electrically connected at its lower end to a second pole of said battery within said weighted body and the spring means has an electrical contact point at its upper end. The spring means has a relaxed length less than the distance between its point of attachment on the battery and the bottom end of the cap means. The flexibility of the spring is such that when a force equal to the weight of the weighted body is exerted on the spring, the spring will stretch an amount greater than the distance between its point of attachment on said battery and the bottom end of said cap means. The second end of the spring means is affixed to the lower end of the line whereby when the plumb bob is supported by its line, the spring means will stretch and touch the lower end of the cap thereby completing its circuit and turning on said light bulb which will shine an axial beam of light directly downwardly thereby marking the point directly below said plumb bob. Preferably, the cap is formed from an electrically conducted material and has a depression in the bottom thereof. In a preferred embodiment, the electrical contact point on the upper end of the spring is generally cylindrical so that it will center itself in the depression at the lower end of the cap. An insulative cylinder is preferably positioned above the bulb and battery assembly and below the cap.

BRIEF DESCRIPTON OF THE DRAWINGS

DESCRIPTION OF THE PREFERRED EMBODIMENTS

Figure 1:
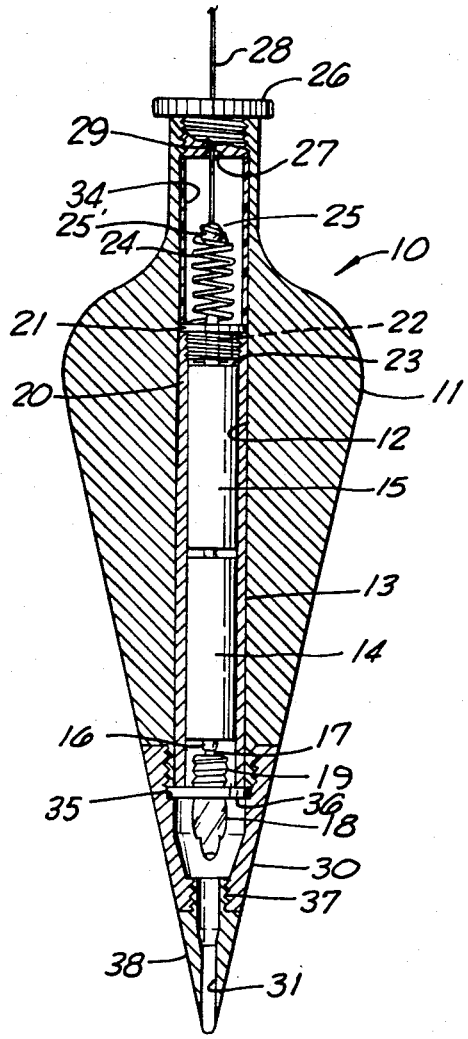
FIG. 1 is a cross-sectional view of the lighted plumb bob of the present invention with its spring in a relaxed configuration.

A cross-sectional view of a lighted plumb bob is shown in FIG. 1 and indicated by reference character 10. Plumb bob 10 has a generally frusto-conical weighted body 11 which is preferably made from brass or other non-corrosive and electrically conductive material. Body 11 has an axial bore 12 into which a cylindrical battery and bulb assembly 13 is held. Assembly 13 has a pair of batteries 14 and 15, battery 14 having a first pole 16 which touches a first terminal 17 of light bulb 18. The second terminal 19 of the bulb comprises the threads thereof which are electrically connected to the housing 20 which preferably is formed from aluminum or other conductive material. Housing 20 electrically contacts the body 11 of the plumb bob.

An insulated cap 21 is threaded into the upper end of the housing 20 and holds a conductive pin 22 which touches the second terminal 23 of battery 15.

An electrically conducted spring 24 is affixed at its lower end to conductive pin 22 and has an electrical contact point 25 at its upper end. An electrically conductive cap 26 is screwed into the upper end of body 11 and has an electrically conductive point or depression 27. A line 28 which is of a conventional nature for plumb bobs is affixed to the upper end of spring 24 by way of a captured sphere 25' and passes through an opening 29 in cap 26.

Figure 2:
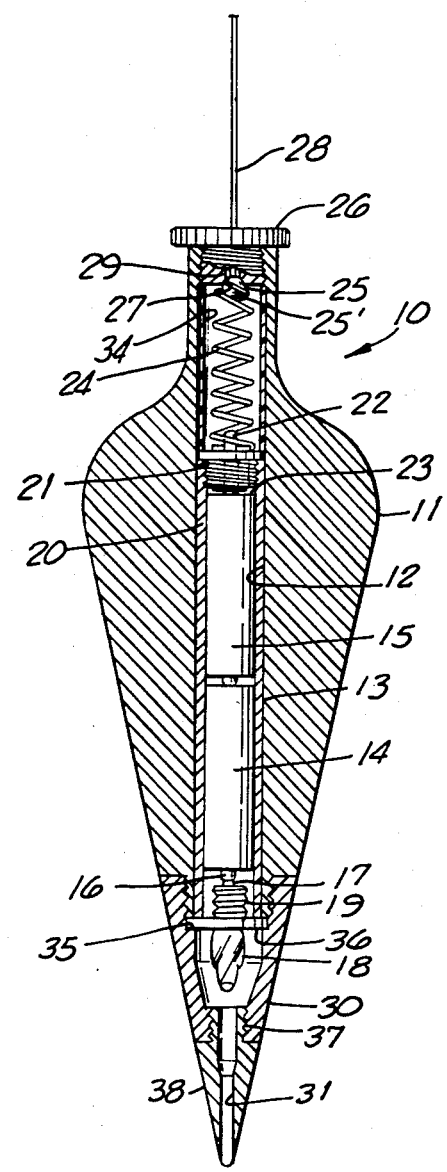
FIG. 2 is a cross-sectional view of the plumb bob of FIG. 1 with its spring in an extended configuration.
Figure 3:
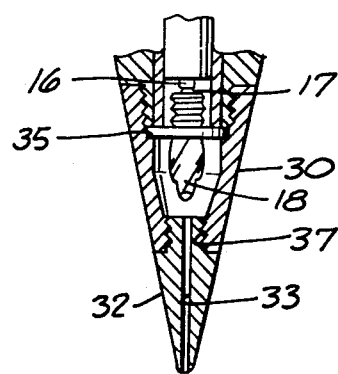
FIG. 3 is a cross-sectional view of the lower portion of the plumb bob of FIG. 1 having a different tip affixed thereto.

In use, as shown in FIG. 2, plumb bob 10 is suspended from its line 28 which elongates spring 24 so that its electrical contact point 25 touches the electrically conductive point 27 of cap 26. This completes the circuit through the body 11 of the plumb bob and turns on bulb 18. A first removable conical member 30 is affixed to the weighted body 11 at its lower end and has a threaded opening 37 into which a tip 38 is screwed. Tip 38 has an axial opening 31 which directs a beam of light from light bulb 18 directly downwardly from the plumb bob. So that the plumb bob may be used in different environments, a plurality of removable tips are provided and a tip 32 is shown in FIG. 3 which has an axial opening 33 which is smaller in diameter than opening 31 and thus projects a smaller beam of light for more accurate work. Preferably, tip 38 and tip 32 are made from stainless steel so that its central opening is less likely to be damaged if it is inadvertently dropped on the tip.

In order to prevent the accidental completion of the circuit when the spring is in a relaxed configuration, a non-conducting shield 34 may be provided within the upper portion of axial bore 12.

In order to change the batteries, the battery and bulb assembly 13 may be removed by unscrewing the generally frusto-conical member or tip 30 which has a shoulder 35 which abuts a disk 36 which is located at the lower end of housing 20. This permits the battery and bulb assembly together with the line to be pulled out of the body 11 of the plumb bob, either the lower or upper end may then be unscrewed and replacement batteries inserted.

The use of an electrically conductive, generally spherical depression such as contact point 27 together with a generally spherical, electrical contact point such as sphere 25' provides a particularly accurate positioning of the line 28 along the axis of the plumb bob. The automatic disconnecting of the circuit by the contraction of spring 24 greatly reduces the possibility that the light will be unnecessarily left on when the plumb bob is not in use. The result in thus a plumb bob which has exceptionally long life and which may be operable when needed.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. An improved plumb bob of the type having a generally frusto-conical, weighted body and a line affixed to the wide end of the body, wherein the improvement comprises:

an axial bore in said body, said bore terminating at its lower end with a removable, generally conical member, said generally conical member having an axial opening, said member also having means for attachment to the weighted body;

a light bulb and battery assembly held within said axial bore, said assembly including a conductive cylindrical housing having an insulative cap on its upper end and said assembly being oriented so that the light bulb portion thereof is directed downwardly, said light bulb having two conventional terminals thereon and said assembly having at least one battery therein and a first pole of said battery touching one terminal of said light bulb;

cap means affixed to said weighted body at the upper end thereof, said cap means having an opening therethrough, said opening lying along the axis of said weighted body, the bottom end of said cap means being electrically conductive and being electrically connected to said weighted body and said line passing through said cap means;

electrically conductive spring means electrically connected at its lower end to a second pole of said battery within said weighted body by way of a conductive pin held by said insulative cap, which conductive pin passes therethrough and is affixed to the second pole of said battery and having an electrical contact point at the upper end of said spring means, said spring means having a relaxed length less than the distance between its point of attachment on said battery and the bottom end of said cap means and said spring having a flexibility so that when a force equal to the weight of said weighted body is exerted on said spring, said spring means will stretch an amount greater than said distance between its point of attachment on said battery and the bottom end of said cap means, the second end of said spring means being affixed to the lower end of said line whereby when said plumb bob is supported by its line, the spring means will stretch and touch the lower end of the cap means thereby completing the circuit and turning on said light bulb which will shine on axial beam of light directly downward by marking the point directly below said plumb bob; and an electrically non-conductive shield positioned in said axial bore between said spring means and the axial bore, whereby electrical contact between said spring means and said axial bore is prevented.

2. The plumb bob of claim 1 wherein said cap means is formed from an electrically conductive material and said cap means has a depression in the bottom thereof at the point where said line passes therethrough so that the line is directed to the center of the cap.

3. The plumb bob of claim 1 wherein there are a plurality of conical tips each tip having a different size axial hole therethrough.

4. The plumb bob of claim 1 wherein said weighted body is formed from brass.

5. The plumb bob of claim 1 wherein said electrical contact point on upper end of spring is generally spherical.

6. The plumb bob of claim 1 wherein said removable, generally conical member has a removable stainless steel tip.

* * * * *